(12) United States Patent
Padiyath et al.

(10) Patent No.: US 9,903,549 B2
(45) Date of Patent: Feb. 27, 2018

(54) DAYLIGHT REDIRECTING GLAZING LAMINATES

(71) Applicant: 3M INNOVATIVE PROPERTIES COMPANY, Saint Paul, MN (US)

(72) Inventors: Raghunath Padiyath, Woodbury, MN (US); Jonathan F. Mansheim, Woodbury, MN (US); Stephen J. Kuncio, Saint Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/892,042

(22) PCT Filed: May 30, 2014

(86) PCT No.: PCT/US2014/040123
§ 371 (c)(1),
(2) Date: Nov. 18, 2015

(87) PCT Pub. No.: WO2014/194154
PCT Pub. Date: Dec. 4, 2014

(65) Prior Publication Data
US 2016/0097502 A1    Apr. 7, 2016

Related U.S. Application Data

(60) Provisional application No. 61/830,048, filed on May 31, 2013.

(51) Int. Cl.
*F21S 11/00* (2006.01)
*G02B 5/02* (2006.01)
(Continued)

(52) U.S. Cl.
CPC ......... *F21S 11/007* (2013.01); *B32B 17/1044* (2013.01); *B32B 17/10743* (2013.01);
(Continued)

(58) Field of Classification Search
CPC .......... F21S 11/007; F21S 11/00; G02B 5/045
(Continued)

(56) References Cited

U.S. PATENT DOCUMENTS 3,096,684 A * 7/1963 Warnke .................... E04C 1/42
359/593
3,610,724 A  10/1971 Frizzell
(Continued)

FOREIGN PATENT DOCUMENTS

| JP | 2012-255951 | 12/2012 |
| WO | WO 93/25792 | 12/1993 |

(Continued)

OTHER PUBLICATIONS

"Dupont Ionomer-Based Encapsulants for Photovoltaics." Dupont®. www.photovoltaics.dupont.com. 2014. http://www.dupont.com/content/dam/dupont/products-and-services/solar-photovoltaic-materials/solar-photovoltaic-materials-landing-documents/DEC-DuPont-Ionomer-Based-Encapsulants-for-PV.pdf. Accessed Dec. 15, 2016.

(Continued)

*Primary Examiner* — Christopher Mahoney
(74) *Attorney, Agent, or Firm* — Eric D. Levinson (57) ABSTRACT

The present disclosure is directed on some embodiments to light redirecting constructions comprising a first glazing substrate, a light redirecting film comprising at least one microstructure surface, a second glazing substrate, and a first interlayer bonding the first glazing substrate to both the light redirecting film and the second glazing substrate; wherein the light redirecting film has an area smaller than the area of the first interlayer.

19 Claims, 4 Drawing Sheets

(51) Int. Cl.
*G02B 5/20* (2006.01)
*B32B 17/10* (2006.01)

(52) U.S. Cl.
CPC .. *B32B 17/10761* (2013.01); *B32B 17/10788* (2013.01); *F21S 11/00* (2013.01); *G02B 5/0294* (2013.01); *G02B 5/208* (2013.01)

(58) Field of Classification Search
USPC .......................................................... 359/592
See application file for complete search history.

(56) References Cited

U.S. PATENT DOCUMENTS

| | | | |
|---|---|---|---|
| 3,711,176 | A | 1/1973 | Alfrey, Jr. |
| 3,940,896 | A * | 3/1976 | Steel ........................ F21V 11/02 160/107 |
| 4,446,305 | A | 5/1984 | Rogers |
| 4,540,623 | A | 9/1985 | Im |
| 4,799,745 | A * | 1/1989 | Meyer ............... B32B 17/10174 204/192.27 |
| 5,448,404 | A | 9/1995 | Schrenk |
| 5,461,496 | A * | 10/1995 | Kanada ..................... E06B 9/24 359/592 |
| 5,882,774 | A | 3/1999 | Jonza |
| 6,007,901 | A | 12/1999 | Maschwitz |
| 6,045,894 | A | 4/2000 | Jonza |
| 6,163,402 | A | 12/2000 | Chou |
| 6,531,230 | B1 | 3/2003 | Weber |
| 7,985,478 | B2 | 7/2011 | Baumgart |
| 8,107,164 | B2 * | 1/2012 | Tsai ........................ G02B 5/045 359/443 |
| 8,307,602 | B2 * | 11/2012 | Cochran, Jr. ............. E06B 7/08 160/104 |
| 8,601,757 | B2 * | 12/2013 | Jaster ........................ E04C 2/54 359/592 |
| 2001/0022982 | A1 | 9/2001 | Neavin |
| 2006/0154049 | A1 | 7/2006 | Padiyath |
| 2008/0291541 | A1 * | 11/2008 | Padiyath .................. E06B 9/24 359/569 |
| 2011/0255303 | A1 | 10/2011 | Nichol |
| 2011/0289869 | A1 | 12/2011 | Jaster |

FOREIGN PATENT DOCUMENTS

| | | | |
|---|---|---|---|
| WO | WO 1999-39224 | 8/1999 | |
| WO | WO 2005-005162 | 1/2005 | |
| WO | WO 2011-084391 | 7/2011 | |
| WO | WO 2012-134787 | * 10/2012 | ............. G02B 5/045 |
| WO | WO 2012-134787 | 10/2012 | |
| WO | WO 2013-012858 | 1/2013 | |
| WO | WO 2013-012865 | 1/2013 | |

OTHER PUBLICATIONS

Modern Optic Engineering by W. J. Smith, McGraw-Hill, 1966, pp. 104-105.
International Search Report for PCT International Application No. PCT/US2014/040123, dated Oct. 14, 2014, 3pgs.
Supplemental European Search Report for EP 14 80 3430 dated Dec. 16, 2016.

* cited by examiner

DAYLIGHT REDIRECTING GLAZING LAMINATES

CROSS REFERENCE TO RELATED APPLICATIONS

This application is a national stage filing under 35 U.S.C. 371 of International Application No. PCT/US2014/040123, filed 30 May 2014, which claims priority to U.S. Provisional Application No. 61/830,048, filed 31 May 2013. This disclosures of both applications are incorporated by reference in their entirety herein.

The present application claims priority from U.S. Provisional Application No. 61/830,048, filed on May 31, 2013, which is incorporated in its entirety herein by reference.

FIELD OF THE DISCLOSURE

This disclosure relates generally to light management constructions, specifically to light redirecting constructions, such as constructions comprising solar light redirecting layers and glazing units.

BACKGROUND

A variety of approaches are used to reduce energy consumption in buildings. Among the approaches being considered and applied is the more efficient use of sunlight to provide lighting inside buildings. One technique for supplying light inside of buildings, such as in offices, etc. is the redirection of incoming sunlight. Because sunlight enters windows at a downward angle, much of this light is not useful in illuminating a room. However, if the incoming downward light rays can be redirected upward such that they strike the ceiling, the light can be more usefully employed in lighting the room.

In general, conventional safety glazing is formed from a laminate made of two rigid layers, typically glass, and an anti-lacerative mechanical energy absorbing interlayer, such as, for example, plasticized polyvinyl butyral (PVB). Typically, the glazing is prepared by placing the PVB layer between glass sheets, eliminating air from the engaging surfaces, and then subjecting the assembly to elevated temperature and pressure in an autoclave to fusion-bond the PVB and glass into an optically-clear structure. The glazing may then be used in buildings, or the windows, windshields, or rear glass of a motor vehicle.

SUMMARY

Microstructured films are used to redirect sunlight to provide illumination within a room. Microstructured films are typically adhered to glass substrates with a pressure sensitive adhesive. When microstructured films are adhered to the glass with the structured surface exposed they are susceptible to mechanical damage in use. The optical properties of the microstructured films may be altered if scratched or otherwise damaged. The present disclosure provides microstructured films laminated between glazing panes that retain light-redirecting properties and methods of preparing such microstructured films.

BRIEF DESCRIPTION OF THE FIGURES

In another embodiment, the second glazing substrate has a diffusing or textured surface.

DETAILED DESCRIPTION

A film may be laminated to a microstructured film to protect the optically active structures. However, this process may alter the optical characteristics of the film and is less desirable. Furthermore, unless the film is substantially bonded to the top of the structures, the protective film may be affected upon repeated thermal cycling.

It has been surprisingly found that the light redirecting constructions of this disclosure retain the light redirecting properties of the microstructured films even when the films have been subjected to the high pressures and high temperatures associated with laminating conditions.

The present disclosure enables the production of a daylight redirecting window system where the light redirecting microstructure is protected by a glazing structure and is mechanically stable.

Disclosed herein are light redirecting glazing constructions. In some embodiments the light redirecting glazing construction is directed to solar light redirecting constructions. In some embodiments, the solar light redirecting constructions comprise a first glazing substrate, a light redirecting film comprising at least one microstructure surface, a second glazing substrate, and a first interlayer bonding the first glazing substrate to both the light redirecting film and the second glazing substrate; wherein the light redirecting film has an area smaller than the area of the first interlayer.

In one aspect of the present disclosure a glazing laminate is provided. In one embodiment, the glazing laminate comprises at least two glazing substrates, at least one interlayer that bonds the two glazing laminates and a microstructured optical film that is adjacent to one of the glazing substrates and the interlayer. The microstructured film is disposed on an area smaller than the area of each of the glazing substrates, which also means that the microstructured film has an area smaller than the area of the interlayer. See FIG. 1 for a schematic representation of two embodiments of the present disclosure.

In one embodiment, the space enclosed between the glazing substrate and a microstructured film is filled by aerogel.

In another aspect of the disclosure, an insulated glazing unit comprising at least two glazing panes is provided, wherein one of the glazing panes comprises a laminate comprising an optical microstructured film.

Interlayers are typically used to bond two or more glazing substrates to provide a laminated glazing (see e.g. U.S. Pat. No. 7,18,457). An interlayer comprising polyvinyl butyrate (PVB) or ethylene vinyl acetate (EVA) may be used to bond two or more layers of glass where the PVB or EVA is in contact with the entire surface of the glass. Any interlayer can be used in embodiments of the present disclosure, such as in the embodiments described in FIG. 1, as long as the interlayer is able to bond a first glazing substrate to both the microstructured optical film and a second glazing substrate. In other embodiments, a second interlayer may be used to bond an third glazing substrate to the second glazing substrate if desired. In other embodiments, the interlayer may be clear or diffusing.

Microstructured films that can be used in embodiments of this disclosure include microstructures used to redirect incident sunlight onto the ceiling, such as those described in PCT publications Nos. WO 2011/084391, WO 2012/134787, WO 2013/012865, WO 2013/012858, the disclosures of each of those publications is hereby incorporated by reference in their entirety. The microstructured films of U.S. Pat. No. 8,107,164 may also be used in some embodiments of this disclosure.

The term "adjacent" as used herein, when referring to two layers, means that the two layers are in proximity with one another with no intervening open space between them. They may be in direct contact with one another (e.g. laminated together) or there may be intervening layers. Examples of two layers disposed on a substrate where layer 1 and layer 2 are adjacent include the configurations: substrate/layer 1/layer 2; and layer 1/substrate/layer 2. The term "optical substrate" as used herein refers to substrates that are at least optically transparent, may be optically clear and may also produce additional optical effects. Examples of optical substrates include optical films and glazing substrates, such as glass plates.

The term "light diffusing" as used herein regarding substrates, such as glazing substrates, and films, such as optical films, refers to substrates or films that are designed to diffuse light. This light diffusion may be effected, for example, through the use of a textured surface of a substrate, or through other means such as incorporation of light diffusing particles within the matrix of a film. While it is noted that all optical articles can be considered to diffuse light to some extent, substrates and films that are optically transparent or optically clear are not considered to be "light diffusing" unless some light diffusing property is imparted to these substrates or films.

The term "optical film" as used herein refers to films that are at least optically transparent, may be optically clear and may also produce additional optical effects. Examples of additional optical effects include, for example, light diffusion, light polarization or reflection of certain wavelengths of light.

The term "optically transparent" as used herein refers to films or constructions that appear to be transparent to the naked human eye. The term "optically clear" as used herein refers to film or article that has a high light transmittance over at least a portion of the visible light spectrum (about 400 to about 700 nanometers), and that exhibits low haze. An optically clear material often has a luminous transmission of at least 90 percent and a haze of less than 2 percent in the 400 to 700 nm wavelength range. Both the luminous transmission and the haze can be determined using, for example, the method of ASTM-D 1003-95.

The term "ordered arrangement" as used herein to describe a plurality of structures, refers to a regular, repeated pattern of structures.

The terms "point", "side", and "intersection" as used herein, have their typical geometric meanings.

The term "aspect ratio" as used herein when referring to a structure attached to a substrate, refers to the ratio of the greatest height of the structure above the substrate to the base of the structure that is attached to, or part of, the substrate.

The term "adhesive" as used herein refers to polymeric compositions useful to adhere together two adherends. Examples of adhesives are curable adhesives, heat activated adhesives, and pressure sensitive adhesives.

Curable adhesives are adhesives that contain a curable reaction mixture which cures to form an adhesive bond. Unlike heat activated adhesives (removable upon the application of heat) and pressure sensitive adhesives, curable adhesives are generally not removable after curing and are intended to form a permanent bond between two adherends.

Heat activated adhesives are non-tacky at room temperature but become tacky and capable of bonding to a substrate at elevated temperatures. These adhesives usually have a glass transition temperature (Tg) or melting point (Tm) above room temperature. When the temperature is elevated above the Tg or Tm, the storage modulus usually decreases and the adhesive becomes tacky.

Pressure sensitive adhesive compositions are well known to those of ordinary skill in the art to possess at room temperature properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

As used herein, the term "microstructure" means the configuration of features wherein at least 2 dimensions of the features are microscopic. The topical and/or cross-sectional view of the features must be microscopic.

As used herein, the term "microscopic" refers to features of small enough dimension so as to require an optic aid to the naked eye when viewed from any plane of view to determine its shape. One criterion is found in Modern Optic Engineering by W. J. Smith, McGraw-Hill, 1966, pages 104-105 whereby visual acuity, " . . . is defined and measured in terms of the angular size of the smallest character that can be recognized." Normal visual acuity is considered to be when the smallest recognizable letter subtends an angular height of 5 minutes of arc on the retina. At typical working distance of 250 mm (10 inches), this yields a lateral dimension of 0.36 mm (0.0145 inch) for this object.

In other embodiments, an additional layer may be present in the light redirecting constructions of the present disclosure. Examples of suitable additional layers that can be used include, for example, low emissivity (Low-e) layers, infrared light rejecting layers, and color or tinting layers. Examples of Low-e layers are Low-e coatings which reflect mid to far infrared energy. There are two general types of Low-e coatings: pyrolytic Low-e coatings, commonly referred to as "hard coats" are applied during the manufacture of glass; Low-e coating applied in a vacuum process, commonly referred to as "soft coats" are applied after the glass plate is manufactured. Low-e coatings, if used on, for example, glazing substrates, are generally not present on glazing surfaces to which additional coatings or layers are disposed. For example, if the glazing substrate has a Low-e coating, the visible light diffusing layer and/or light redirecting layer are not attached to the Low-e coated surface.

Examples of infrared light rejecting layers include a wide range of possible layers. Infrared light may be rejected by reflection of the infrared light, by absorption of the infrared light, or by a combination thereof. A variety of multi-layer films have been developed to reflect infrared light while allowing the transmission of visible light. Examples of such multi-layer films include Fabry-Perot interference filters such as described in U.S. Pat. Nos. 4,799,745 and 6,007,901. Other examples are multi-layer polymeric optical films that have been described in, for example, U.S. Pat. No. 3,610,724 (Rogers); U.S. Pat. No. 3,711,176 (Alfrey, Jr. et al.), U.S. Pat. No. 4,446,305 (Rogers et al.); U.S. Pat. No. 4,540,623 (Im et al.); U.S. Pat. No. 5,448,404 (Schrenk et al.); U.S. Pat. No. 5,882,774 (Jonza et al.); U.S. Pat. No. 6,045,894 (Jonza et al.); U.S. Pat. No. 6,531,230 (Weber et al.); PCT Publication WO 99/39224 (Ouderkirk et al.); and US Patent Publications 2001/0022982 (Neavin et al.); and 2006/0154049 (Padiyath et al.). In such polymeric multi-layer optical films, polymer materials are used predominantly or exclusively in the makeup of the individual layers. Such films can be compatible with high volume manufacturing processes, and may be made in large sheets and roll goods.

Infrared light may also be rejected by the use of an infrared absorbing layer instead of, or in conjunction with, an infrared light reflecting layer. An example of such an infrared light absorbing layer is a layer comprising infrared absorbing nanoparticles dispersed within a cured polymeric binder. In some embodiments, this infrared light absorbing layer has a thickness in a range from 1 to 20 micrometers, or from 1 to 10 micrometers, or from 1 to 5 micrometers. This infrared light absorbing layer can include a plurality of metal oxide nanoparticles. A partial listing of metal oxide nanoparticles includes tin, antimony, indium and zinc oxides and doped oxides. In some embodiments, the metal oxide nanoparticles include, tin oxide, antimony oxide, indium oxide, indium doped tin oxide, antimony doped indium tin oxide, antinomy tin oxide, antimony doped tin oxide or mixtures thereof. In some embodiments, the metal oxide nanoparticles include tin oxide or doped tin oxide and optionally further includes antimony oxide and/or indium oxide. The polymeric binder layer includes infrared radiation absorbing nanoparticles dispersed through the polymeric binder layer. The infrared radiation absorbing nanoparticles may include any material that preferentially absorbs infrared radiation. Examples of suitable materials include metal oxides such as tin, antimony, indium and zinc oxides and doped oxides. In some instances, the metal oxide nanoparticles include, tin oxide, antimony oxide, indium oxide, indium doped tin oxide, antimony doped indium tin oxide, antinomy tin oxide, antimony doped tin oxide or mixtures thereof. In some embodiments, the metal oxide nanoparticles include antimony oxide (ATO) and/or indium tin oxide (ITO). In some cases, the infrared radiation absorbing nanoparticles may include or be made of lanthanum hexaboride, or $LaB_6$.

Optional additional layers may also include color or tinting layers. These may be applied to the glazing substrate or to other layers. These layers may be film layers or coatings.

A wide variety of glazing substrates are suitable in the constructions of this disclosure. In some embodiments, two glazing substrates are present, in other embodiments multiple glazing substrates are present.

Suitable glazing substrates are at least optically transparent, and may be optically clear. Examples of suitable substrates include, for example, windows. Windows may be made of a variety of different types of glazing substrates such as a variety of glasses or from polymeric materials such as polycarbonate or polymethyl methacrylate. In some embodiments, the window may also comprise additional layers or treatments. Examples of additional layers include, for example, additional layers of film designed to provide tinting, shatter resistance and the like. Examples of additional treatments that may be present of windows include, for example, coatings or various types such as hardcoats, and etchings such as decorative etchings.

In many embodiments, the structures of this disclosure comprise an optional light diffusing layer, which can include a light diffusing film or coating that is capable of providing bulk diffusion of visible light. These light diffusing films or coatings may also comprise additional functionality besides the diffusion of light. For example, the coatings may be hard coats to provide resistance to scratching, marring or soiling or they may have adhesive properties. The films may provide light control properties such as infrared light reflection or physical properties such as shatter resistance.

Typically, these films or coatings comprise light scattering particles dispersed within a cured binder matrix. The light scattering particles and the binder have different refractive indices. In many embodiments, the light scattering particles have a first refractive index and the binder has a second refractive index and the second refractive index is at least a value of 0.05 different than the first refractive index. In some embodiments, the light scattering particles have a first refractive index and the binder has a second refractive index and the second refractive index is at least a value of 0.1 different than the first refractive index. The light diffusing layer provides the hybrid construction with a haze value of at least 10% or greater or at least 30% or greater, or at least 50% or greater. Another property that can be used to measure the optical properties of the light diffusing layer is clarity. Typically, clarity is in the range of 10-99%. Clarity is also a measure of the scattering of light and therefore layers that have a relatively high haze are also going to have their clarity affected. Haze and clarity are measured according to ASTM D 1003-00. In some embodiments, the light diffusing layer provides the hybrid construction with a haze value range from 10% to 95%, or from 20% to 75%. The particles can be formed of any useful light scattering material and can have any useful size and loading within the binder. In many embodiments, the particles have an approximate diameter in a range from 1 to 25 micrometers and a refractive index in a range from 1.5 to 1.6. Illustrative light diffusing layers are described in U.S. Pat. No. 6,163,402 (Chou et al.), and PCT Publication WO 2005/005162 (Hayashi et al.) which described illustrative printed light diffusing layers.

Examples of suitable diffusive films include members of the FASARA line of films commercially available from 3M Company, St. Paul, Minn. The optical properties (Transmittance, Haze and Clarity) of some of these films and the films on a glass plate are shown in Table A below. The optical properties were measured using a "HAZE-GARD PLUS" (BYK-Gardner, Columbia, Md.) according to test method ASTM D1003. In Table A, "Film Only" means just the FASARA film was measured, the other measurements were made of laminates of the FASARA film on a glass plate.

TABLE A

| Sample FASARA Film | Film Only | | | Film on 3 mm thick glass with film side towards light | | |
|---|---|---|---|---|---|---|
| | Trans (%) | Haze (%) | Clarity (%) | Trans (%) | Haze (%) | Clarity (%) |
| SAN MARINO | 68 | 100 | 15 | 56 | 100 | 18 |
| LAUSANNE | 92 | 42 | 54 | 88 | 40 | 54 |
| MAT CRYSTAL i | 93 | 57 | 20 | 89 | 56 | 19 |
| MILANO | 77 | 93 | 30 | 70 | 90 | 31 |
| FINE CRYSTAL | 93 | 42 | 33 | 90 | 41 | 33 |

In some embodiments, the light diffusing layer binder is a cured polymeric material that can function as a hardcoat. Suitable polymeric binders include the thermal and/or UV-polymerized (i.e., cured) products of acrylate and/or methacrylate monomers. A suitable cured binder is the thermal and/or UV-polymerized product of a brominated, alkyl-substituted phenyl acrylate or methacrylate (e.g., 4,6-dibromo-2-sec-butyl phenyl acrylate), a methyl styrene monomer, a brominated epoxy diacrylate, 2-phenoxyethyl acrylate, and a hexa-functional aromatic urethane acrylate oligomer, as described in U.S. Pat. No. 6,355,754. While most types of energy polymerizable telechelic monomers and oligomers are useful for forming these polymeric binders, acrylates are preferred because of their high reactivity. The curable binder composition should be of flowable viscosity that is low enough that air bubbles do not become entrapped in the composition. Reactive diluents can be mono- or di-functional monomers such as, for example, SR-339, SR-256, SR-379, SR-395, SR-440, SR-506, CD-611, SR-212, SR-230, SR-238, and SR-247 available from Sartomer Co., Exton, Pa. Typical useful oligomers and oligomeric blends include CN-120, CN-104, CN-115, CN-116, CN-117, CN-118, CN-119, CN-970A60, CN-972, CN-973A80, CN-975 available from Sartomer Co., Exton, Pa. and Ebecryl 1608, 3200, 3201, 3302, 3605, 3700, 3701, 608, RDX-51027, 220, 9220, 4827, 4849, 6602, 6700-20T available from Surface Specialties, Smyrna, Ga. Additionally, a multi-functional crosslinker can assist in providing a durable, high crosslink density composite matrix. Examples of multifunctional monomers include SR-295, SR-444, SR-351, SR-399, SR-355, and SR-368 available from Sartomer Co., Exton, Pa. and PETA-K, PETIA and TMPTA-N available from Surface Specialties, Smyrna, Ga. Multi-functional monomers can be used as crosslinking agents to increase the glass transition temperature of the binder polymer that results from the polymerizing of the polymerizable composition. The light diffusing layer binder can form a hard resin or hardcoat. The term "hard resin" or "hardcoat" means that the resulting cured polymer exhibits an elongation at break of less than 50 or 40 or 30 or 20 or 10 or 5 percent when evaluated according to the ASTM D-882-91 procedure. In some embodiments, the hard resin polymer can exhibit a tensile modulus of greater than 100 kpsi ($6.89 \times 10^8$ Pascals) when evaluated according to the ASTM D-882-91 procedure. In some embodiments, the hard resin polymer can exhibit a haze value of less than 10% or less than 5% when tested in a Taber abrader according to ASTM D 1044-99 under a load of 500 g and 50 cycles (haze can be measured with Haze-Gard Plus, BYK-Gardner, Md., haze meter).

In some embodiments, at least one of the first interlayer or the second interlayer if present, comprises an UV blocking agent, such as a UV absorber (UVA) or hindered amine light stabilizer (HALS).

Ultraviolet absorbers function by preferentially absorbing ultraviolet radiation and dissipating it as thermal energy. Suitable UVAs may include: benzophenones (hydroxybenzophenones, e.g., Cyasorb 531 (Cytec)), benzotriazoles (hydroxyphenylbenzotriazoles, e.g., Cyasorb 5411, Tinuvin 329 (Ciba Geigy)), triazines (hydroxyphenyltriazines, e.g., Cyasorb 1164), oxanilides, (e.g., Sanuvor VSU (Clariant)) cyanoacrylates (e.g., Uvinol 3039 (BASF)), or benzoxazinones. Suitable benzophenones include, CYASORB UV-9 (2-hydroxy-4-methoxybenzophenone, CHIMASSORB 81 (or CYASORB UV 531) (2 hyroxy-4 octyloxybenzophenone). Suitable benzotriazole UVAs include compounds available from Ciba, Tarrytown, N.Y. as TINUVIN P, 213, 234, 326, 327, 328, 405 and 571, and CYASORB UV 5411 and CYASORB UV 237. Other suitable UVAs include CYASORB UV 1164 (2-[4,6-bis(2,4-dimethylphenyl)-I 3,5-triazin-2yl]-5(oxctyloxy) phenol (an exemplary triazine) and CYASORB 3638 (an exemplary benzoxiazine).

Hindered amine light stabilizers (HALS) are efficient stabilizers against light-induced degradation of most polymers. HALS do not generally absorb UV radiation, but act to inhibit degradation of the polymer. HALS typically include tetra alkyl piperidines, such as 2,2,6,6-tetramethyl-4-piperidinamine and 2,2,6,6-tetramethyl-4-piperidinol. Other suitable HALS include compounds available from Ciba, Tarrytown, N.Y. as TINUVIN 123, 144, and 292.

The UVAs and HALS disclosed explicitly here are intended to be examples of materials corresponding to each of these two categories of additives. The present inventors contemplate that other materials not disclosed here but known to those skilled in the art for their properties as UV absorbers or hindered amine light stabilizers can be used as additives to the interlayers of this disclosure.

Other embodiments of the present disclosure are shown in the enclosed Figures.

In another embodiment, the distance from one of the edges of the interlayer to the corresponding edge of the microstructured film is ⅜ inches. In another embodiment, the distance from one of the edges of the interlayer to the corresponding edge of the microstructured film is 0.5 inches. In another embodiment, the distance from one of the edges of the interlayer to the corresponding edge of the microstructured film is greater than 0.5 inches. In other embodiments, the distance from one of the edges of the interlayer to the corresponding edge of the microstructured film is not the same for all sides of the microstructured film.

In another embodiment, the interlayer is present on the area surrounding the daylight redirecting film (DRF), on the area that bonds the two glazing substrates, but is substantially absent from the DRF itself. "Substantially absent" from the DRF in this context means that the interlayer only is in contact with 10% of less than the area of the DRF. In other embodiments, however, the interlayer can contact 20% or less, 30% or less, 40% or less, 50% or less, 60% or less, 70% or less, 80% or less, 90% or less, or 95% or less of the DRF area.

In other embodiments, the light redirecting construction of the present disclosure comprises two glazing substrates and a daylight redirecting film in between the two glazing substrates, but comprises no interlayer to bond the two (or more) glazing substrates to each other. Rather, in this embodiment, the entire structure is held together by the use of a clamp-type device that holds together the two (or more) glazing substrates and the DRF in between them.

Unless otherwise indicated, all numbers in the description and the claims expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviations found in their respective testing measurements.

The recitation of numerical ranges by endpoints includes all numbers subsumed within that range (e.g. a range from 1 to 5 includes, for instance, 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

Daylight Redirecting Film is a product of 3M Company, St. Paul, Minn., stock number 70-0066-8553-4 (26" width) or 70-0066-8552-6 (52" width).

Polyvinylbutyrate (PVB) is available from Kuraray America Inc., (Houston, Tex.) as Trosifol BG R20.

Laminated light redirecting constructions were prepared as follows:

Example 1

Figure 1:
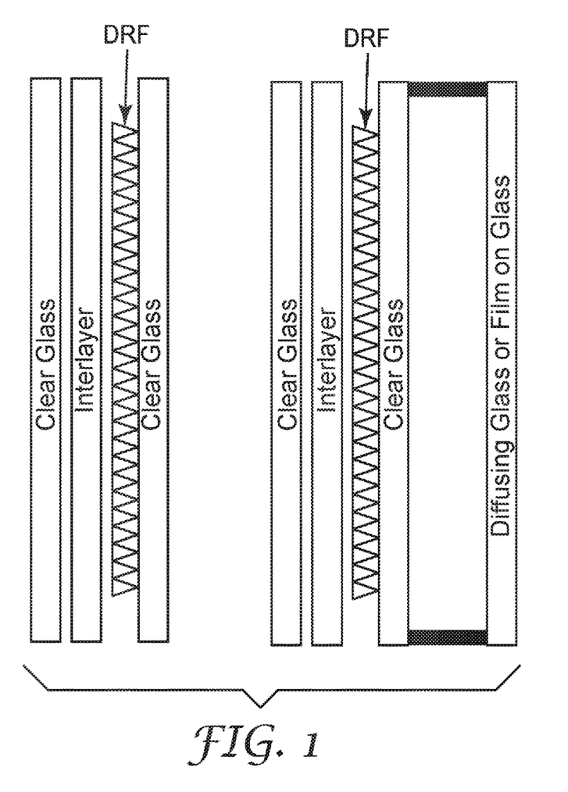
FIG. 1 shows typical embodiments of the present disclosure. In these embodiments, DRF stands for daylight redirecting film and the "clear glass" substrate can be replaced with any other glazing pane, not necessarily made of glass.

To an 8 in.×8 in. piece of ⅛ in. thick annealed float glass, a 15 mil clear PVB film was laminated. Daylight redirecting film, cut to 6 in×6 in size was placed with the smooth PET surface over the PVB film. A second piece of float glass was placed on the structured side of the microstructured film. The laminate was placed in an autoclave at 170 psi for 30 minutes until the bonding cycle completed. A sufficiently-strong bond was formed in the area along the perimeter where PVB was in contact with the two glass surfaces. No intrusion of PVB into the structured surface was seen. Even though the laminate was subjected to a pressure of 170 psi for 30 minutes, the microstructured film was not damaged and light redirecting properties of the film remained unchanged. (FIG. 1). The microstructured surface of the daylight redirecting film used in this example comprised a plurality of prism structures.

Example 2

A laminated light redirecting construction was prepared as in Example 1, except that the clear PVB was replaced with a diffusing PVB and the process repeated. The light redirecting properties were not affected.

Example 3

A laminated light redirecting construction was prepared as in Example 1, except that PVB was replaced with an EVA laminating film. An intrusion of approximately 5 mm of EVA was observed into the daylight redirecting film, but the light redirecting properties of the remaining portion of the film were not affected.

Example 4

A laminated light redirecting construction was prepared as in Example 1, except that the second clear glass substrate was replaced with a diffusing glass with the diffusing surface away from the structured surface.

Example 5

Figure 2:
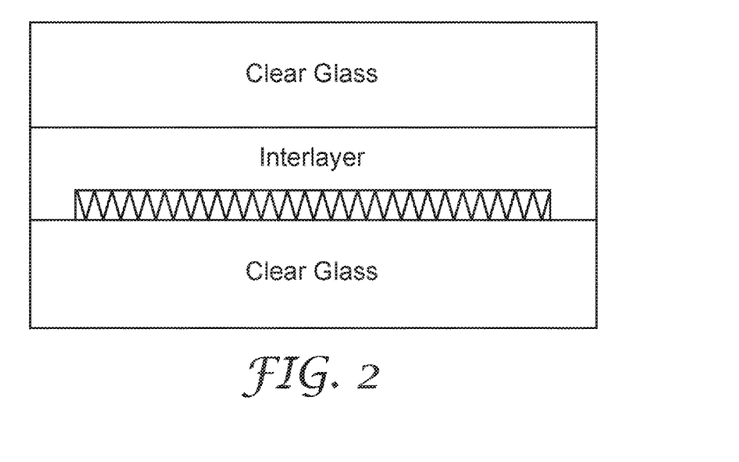
FIG. 2 shows a cross-sectional view of an embodiment of the present disclosure.
Figure 3:
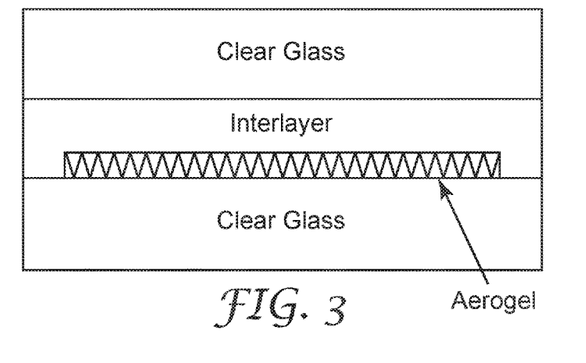
FIG. 3 shows an embodiment of the present disclosure where the space enclosed between the clear glass and a microstructured film is filled by aerogel. In these embodiments, and any other embodiments where "clear glass" is shown in the present application, the "clear glass" substrate can be replaced with any other glazing pane, not necessarily made of glass.
Figure 4:
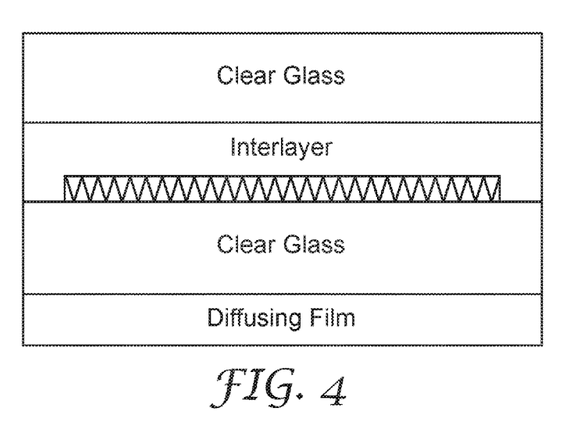
FIG. 4. In this embodiment, a diffusing film is laminated to one of the glazing substrates, represented as "clear glass" in the example in the figure.
Figure 5:
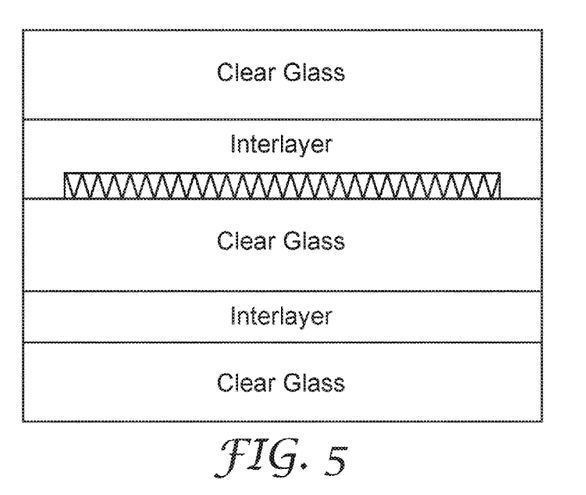
FIG. 5. In this embodiment, a second interlayer, such as a PVB film, is applied to the second glazing substrate and a third glazing substrate is placed over the second interlayer, (e.g., a PVB film). This construction can then be processed in an autoclave. A safety glazing laminate is obtained.
Figure 6:
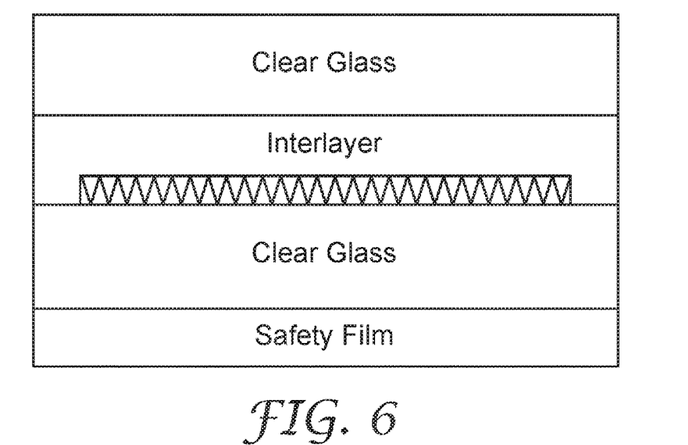
FIG. 6. In this embodiment, a shatter resistant film is applied to the second glazing substrate after the first laminate has been prepared. This enables the structure to retain the glass fragments in the event of glass breakage.
Figure 7:
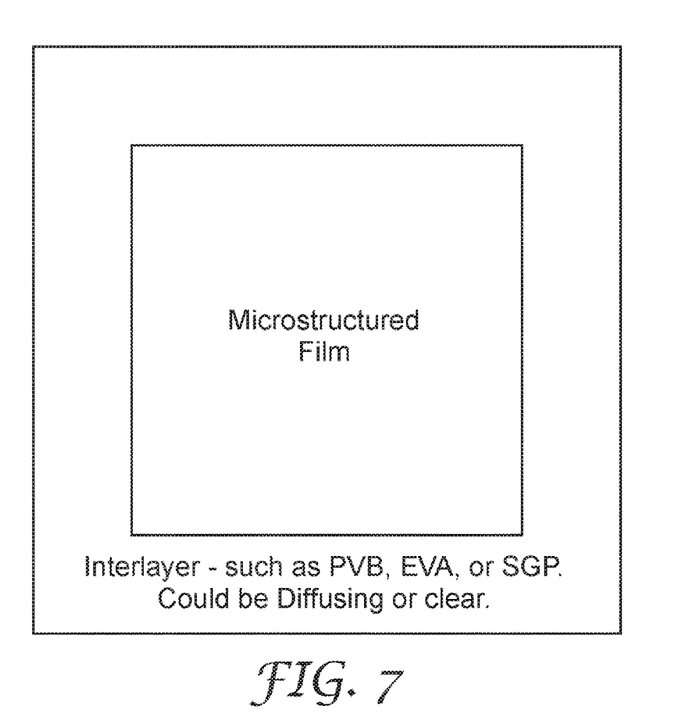
FIG. 7. In this embodiment, the microstructured film has an area that is smaller than the interlayer and where the interlayer completely surrounds the microstructured film. In other embodiments, the interlayer may be longer than the microstructured film in only one dimension, such as, for example, in the horizontal dimension. In other embodiments, the interlayer may be longer than the microstructured film in the vertical dimension.
Figure 8:
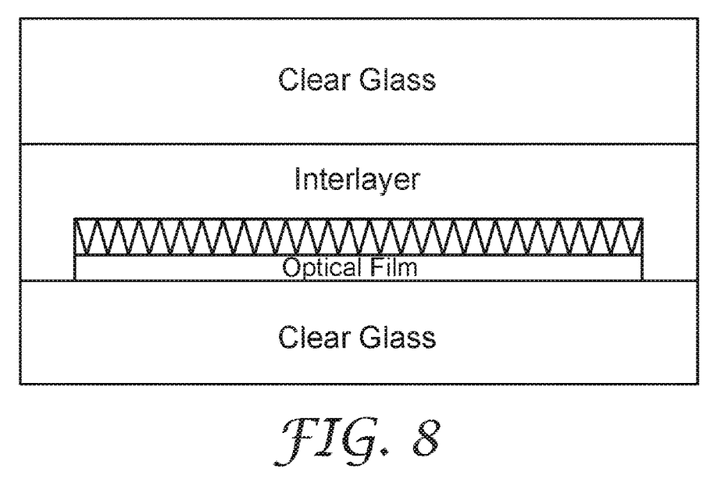
FIG. 8 depicts a construction where the light redirecting film is positioned in the light redirecting construction so that the side of the light redirecting film having the at least one microstructure surface is facing the second glazing substrate; and wherein the light redirecting construction further comprises an optical film located between the light redirecting film and the second glazing substrate.

Laminates were prepared using 6"×6" pieces of ⅛" thick annealed float glass, per FIG. 2. A Films of 0.030" (0.76 mm) PVB was cut to the same area as the glass and applied to a first sheet of glass. The daylight redirecting film was cut to a dimension of either 5.5"×5.5" or 5.25"×5.25". The DRF films was then laid on the PVB film so that the PVB contacted only the non-structured side of the DRF film and there was a PVB-only border of either ¼" or ⅜" with no daylight redirecting film around the perimeter of the assembled laminate. A second sheet of glass was then applied. The air was removed from these laminates by vacuum, and then the laminates were held in an autoclave at a temperature of 285° F. and a pressure of 170 psi for 30 minutes.

After the laminates were removed from the autoclave they were subjected to a 2 hour soak in boiling water consistent with the requirements of both ANSI Z26.1 and ISO EN12543-4. After this exposure, the laminated samples showed no infiltration of moisture around the perimeter of the laminated glass.

Example 6

Two 12"×18" laminated constructions were prepared after the method of Example 5 using ¼" thick annealed float glass. To a first sheet of glass, a 0.030" PVB film was applied to the entire surface, followed by a layer of daylight redirecting film applied with its non-structured side adjacent the PVB layer. The daylight redirecting film was sized to leave a ¼" border of PVB exposed around the perimeter. A second sheet of glass was placed on top to form a laminate construction. This process was repeated to form the second laminated construction. These laminate constructions were de-aired using vacuum and then were heated under vacuum at a temperature of 280° F. for 1 hour. Samples upon initial visual examination did not have any noticeable defects. These laminates were then held at controlled indoor conditions for a period of 9 months. When the laminated glass panels were re-examined, there were areas where the PVB had become unbonded from the glass in the perimeter area but no gross delaminations. None of these unbonded areas extended into the area where the DRF was placed.

The invention claimed is:

1. A light redirecting construction comprising the following elements in the recited order:
    a first glazing substrate;
    a first interlayer adjacent to the first glazing substrate,
    a light redirecting film adjacent to the first interlayer, wherein the light redirecting film comprises at least one microstructure surface;
    a second glazing substrate adjacent to the light redirecting film,
    wherein the light redirecting film has an area smaller than the area of the first interlayer,
    wherein the first interlayer bonds the first glazing substrate to both the light redirecting film and the second glazing substrate,
    wherein the light redirecting film is positioned in the light redirecting construction so that the side of the light redirecting film having the at least one microstructure surface is facing the second glazing substrate; and
    wherein the light redirecting construction further comprises an optical film located between the light redirecting film and the second glazing substrate.

2. The light redirecting construction according to claim 1, wherein the light redirecting construction is a laminate.

3. The light redirecting construction according to claim 1, wherein the light redirecting film is positioned in the light redirecting construction so that the side of the light redirecting film having the at least one microstructure surface is facing the second glazing substrate.

4. The light redirecting construction according to claim 1, wherein the light redirecting film is positioned in the light redirecting construction so that the side of the light redirecting film having the at least one microstructure surface is facing the second glazing substrate and further comprises aerogel in the volume defined by the at least one microstructure surface and the second glazing substrate.

5. The light redirecting construction according to claim 1, further comprising a diffusing film.

6. The light redirecting construction according to claim 1, further comprising a third glazing substrate bonded to the second glazing substrate by a second interlayer.

7. The light redirecting construction according to claim 6, wherein at least one of the first interlayer or the second interlayer if present, is chosen from a clear interlayer and a diffusing interlayer.

8. The light redirecting construction according to claim 1, further comprising a third glazing substrate, wherein the third glazing substrate is not bonded to the second glazing substrate, and is located a distance L1 from the second glazing substrate.

9. The light redirecting construction according to claim 1 further comprising a safety film.

10. The light redirecting construction according to claim 1 further comprising a safety film and wherein the safety film is adjacent the second glazing substrate or, if present, adjacent the third glazing substrate.

11. The light redirecting construction according to claim 1, wherein at least one of the first interlayer or the second interlayer if present, comprises at least one component chosen from polyvinyl butyrate (PVB), ethylene vinyl acetate (EVA), and ionomer interlayer.

12. The light redirecting construction according to claim 1, wherein at least one of the first interlayer or the second interlayer if present, comprises an UV blocking agent.

13. The light redirecting construction according to claim 1, wherein at least one of the first interlayer or the second interlayer if present, has a visible light transmission of less than 90%.

14. The light redirecting construction according to claim 1, wherein the area of the light redirecting film is 98% of the area covered by the first interlayer in the final laminated light redirecting construction.

15. The light redirecting construction according to claim 1, wherein the area of the light redirecting film is 95% of the area covered by the first interlayer in the final laminated light redirecting construction.

16. The light redirecting construction according to claim 1, wherein the area of the light redirecting film is 90% of the area covered by the first interlayer in the final laminated light redirecting construction.

17. The light redirecting construction according to claim 1, wherein the area of the light redirecting film is 80% of the area covered by the first interlayer in the final laminated light redirecting construction.

18. The light redirecting construction according to claim 1, wherein the interlayer is in contact with 10% of less than the area of the light redirecting film.

19. The light redirecting construction according to claim 1, wherein the interlayer contacts a given percentage of the area of the light redirecting film, and wherein that percentage is chosen from 20% or less, 30% or less, 40% or less, 50% or less, 60% or less, 70% or less, 80% or less, 90% or less, and 95% or less.

* * * * *

UNITED STATES PATENT AND TRADEMARK OFFICE
CERTIFICATE OF CORRECTION

PATENT NO. : 9,903,549 B2
APPLICATION NO. : 14/892042
DATED : February 27, 2018
INVENTOR(S) : Raghunath Padiyath It is certified that error appears in the above-identified patent and that said Letters Patent is hereby corrected as shown below:

In the Specification

Column 1
Line 11, Delete "This" and insert -- The --, therefor.
Line 14-16, Below "in their entirety herein." delete "The present application claims priority from U.S. Provisional Application No. 61/830,048, filed on May 31, 2013, which is incorporated in its entirety herein by reference.".

Column 3
Line 53-58, Delete "The term "optical substrate" as used herein refers to substrates that are at least optically transparent, may be optically clear and may also produce additional optical effects. Examples of optical substrates include optical films and glazing substrates, such as glass plates." and insert the same on Column 3, Line 54 as a new paragraph.

Column 8
Line 28, Delete "Sanuvor" and insert -- Sanduvor --, therefor.
Line 29, Delete "Uvinol" and insert -- Uvinul --, therefor.
Line 37, Delete ")-I 3,5-" and insert -- )-I, 3,5- --, therefor.
Line 38, Delete "(oxctyloxy)" and insert -- (octyloxy) --, therefor.
Line 39, Delete "benzoxiazine)." and insert -- benzoxazine). --, therefor.

Column 10
Line 49, Delete "Films" and insert -- Film --, therefor.
Line 53, Delete "films" and insert -- film --, therefor.

Signed and Sealed this
Twenty-first Day of April, 2020

Andrei Iancu
*Director of the United States Patent and Trademark Office*